Nov. 12, 1968     R. L. TURPEN     3,410,576
REVERSIBLE TANDEM-AXLE SEMITRAILER
Filed June 21, 1966     2 Sheets-Sheet 1
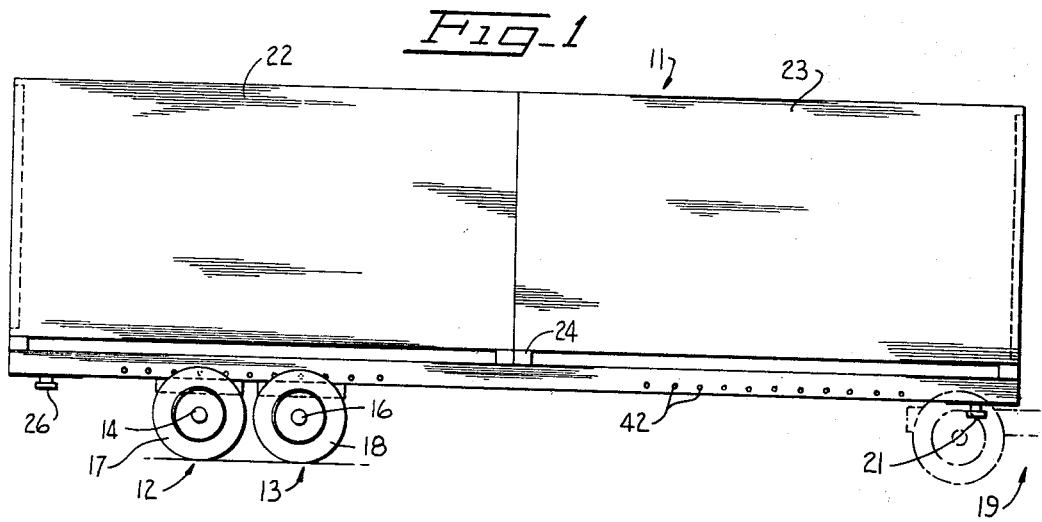
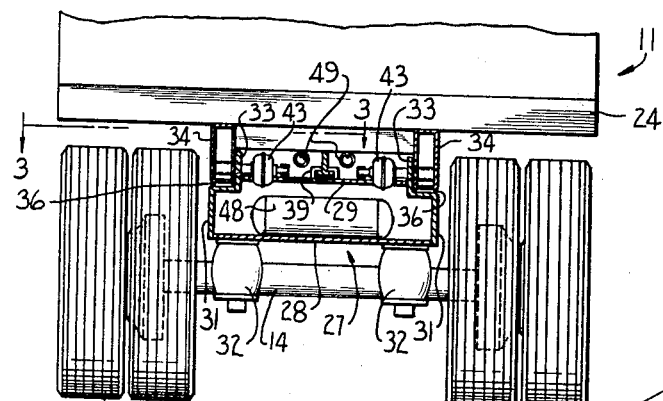
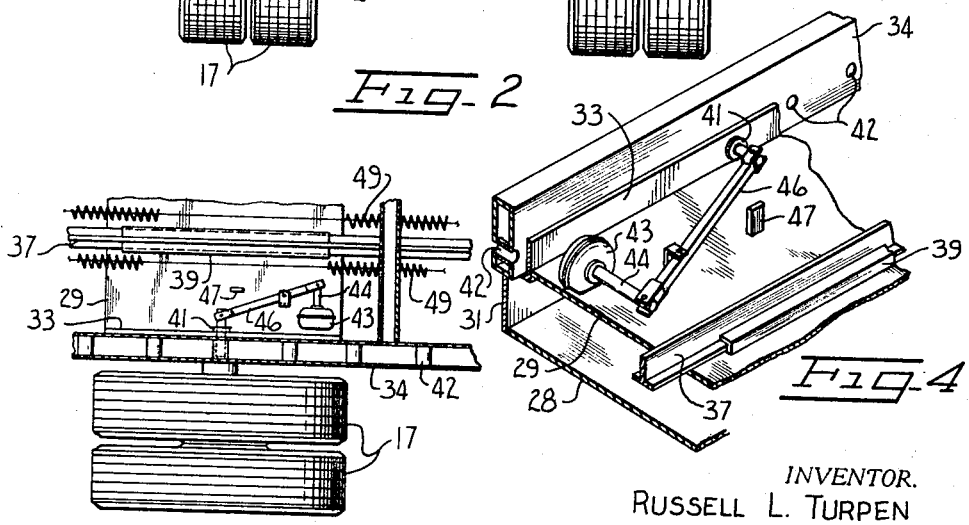
INVENTOR.
RUSSELL L. TURPEN
BY
Gardner & Zimmerman
ATTORNEYS

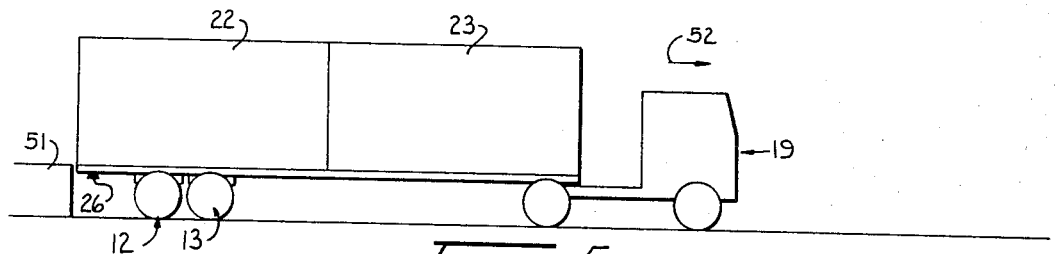
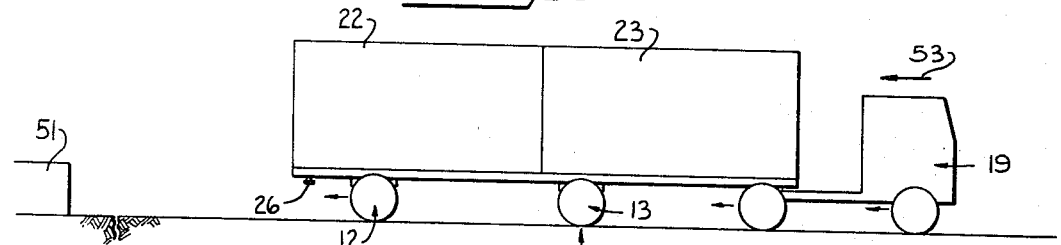
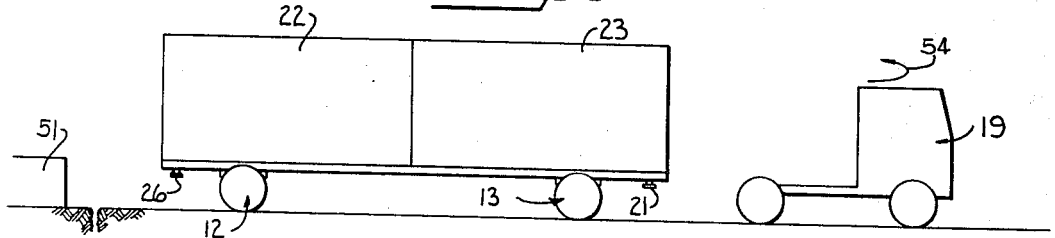
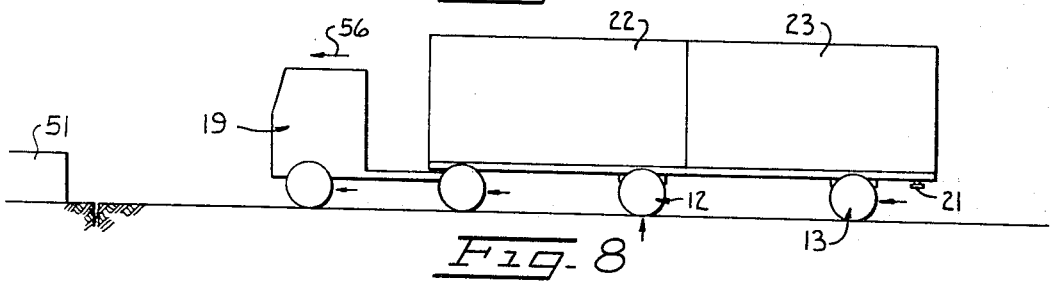
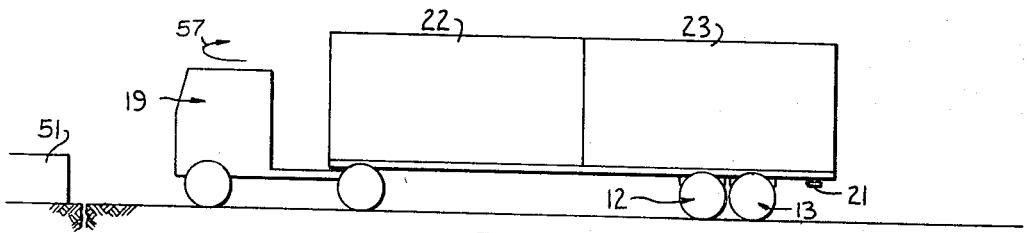

United States Patent Office 3,410,576
Patented Nov. 12, 1968

3,410,576
REVERSIBLE TANDEM-AXLE SEMITRAILER
Russell L. Turpen, North Richmond, Calif., assignor to Compass Container Company, Inc., Richmond, Calif., a corporation of California
Filed June 21, 1966, Ser. No. 559,317
5 Claims. (Cl. 280—423)

ABSTRACT OF THE DISCLOSURE

A semitrailer is described having tandem-axle and wheel assemblies which are movable separately longitudinally of the trailer to facilitate reversal of the trailer without requiring the use of auxiliary retractable landing gear. The trailer includes a bed having longitudinally extending rails to which a pair of axle and wheel assemblies are slidably secured. Each of the axle and wheel assemblies has a separate brake system for its wheels which permit individual braking of each assembly. A locking pin arrangement is associated with each axle and wheel assembly to permit selective locking of the same at different longitudinal positions along the rails, and hitches are provided at each end of the bed for coupling the trailer to a tractor.

---

This invention relates to semitrailers in general, and is more particularly directed to a tandem-axle semitrailer that may be readily reversed under the control of the driver of the tractor towing the trailer to permit loading or unloading from both ends of the trailer.

Semitrailers are frequently employed to transport two large cargo containers supported thereon in longitudinal end to end relation. One end of the trailer is provided with a tandem axle and wheel assembly, while the other end is hitched to and supported by the rear end of a tractor or equivalent draft vehicle. The cargo containers are conventionally provided with doors in only the end walls thereof, and thus access to the containers for unloading of the contents is available only at the ends of the trailer frame or bed. Removal of the contents from the containers is typically facilitated by backing one end of the trailer against or adjacent a wharf, ship, or other location where the contents are to be deposited. The container at the trailing end of the container may be thus unloaded in a ready manner through the doors in the exposed end thereof. However, access to the doors of the container at the other end of the trailer is obstructed by the tractor hitched thereto. It is therefore usually necessary to raise and move such container, as by means of a hoist or crane, to an unobstructed position for unloading of its contents. Alternatively, a reversible trailer may be provided of a type which permits the tractor to be unhitched from one end and hitched to the other end, and vice versa. Thus one end of the trailer may be positioned to permit unloading of the container thereat, and thereafter the trailer may be maneuvered to position the opposite end there for unloading of the second container thereat. More particularly, a conventional reversible semitrailer generally includes sets of retractable landing gear or props adjacent the opposite ends thereof, and a tandem axle and wheel assembly which is selectively movable longitudinally of the trailer to positions adjacent the opposite ends thereof. When it is desired to reverse the trailer, the landing gear is extended to support the trailer at its opposite ends and to slightly elevate the tandem axle and wheel assembly off of the ground. The axle and wheel assembly is then shifted from its position adjacent one end of the trailer to a position adjacent the second end thereof. The tractor is unhitched from the first end of the trailer and hitched to the second end thereof, and the landing gear is retracted. The tractor may then be employed to maneuver the trailer into position wherein the container at the first end thereof may be conveniently unloaded.

Although existing reversible semitrailers are advantageous over conventional semitrailers in that both cargo containers carried thereon may be unloaded without requirement of special equipment such as cranes, etc., such reversible trailers are relatively cumbersome to manipulate in the conduct of the reversing operation, and are relatively expensive by virtue of the auxiliary landing gear. In the reversing operation it is usually necessary for the driver to manually move the axle and wheel assembly once the trailer is supported upon the landing gear. After the assembly is repositioned and the tractor is hitched to the opposite end of the trailer, it is necessary to retract the landing gear, a time consuming operation.

It is an object of the present invention to provide an improved reversible tandem-axle semitrailer which does not require auxiliary retractible landing gear to facilitate reversal.

Another object of the invention is the provision of a reversible semitrailer which is capable of being reversed under the power of the tractor without requirement of manual manipulation on the part of the driver.

A more specific object of the invention is the provision of a tandem-axle semitrailer wherein the tandem axle and wheel assemblies are separable and selectively movable longitudinally of the trailer to facilitate reversal of the trailer.

It is a further object of the invention to provide a reversible semitrailer which is greatly simplified and of much lower cost than existing reversible trailers.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

FIGURE 1 is a side elevational view of a reversible tandem-axle semitrailer in accordance with the present invention.

FIGURE 2 is a fragmentary end view of the trailer illustrating particularly one of the axle and wheel assemblies thereof.

FIGURE 3 is a sectional view taken at line 3—3 of FIGURE 2.

FIGURE 4 is a fragmentary perspective view of a selective locking arrangement of one axle and wheel assembly.

FIGURES 5–9 are diagrammatic representations of the trailer and its associated tractor at a plurality of successive stages of the reversal operation.

Referring now to FIGURE 1 of the drawings, there will be seen to be provided a semitrailer 11 having tandem axle and wheel assemblies 12, 13 adjacent one end, such assemblies respectively including axles 14, 16 having sets of tandem wheels 17, 18 secured to the ends thereof. The opposite end of the trailer is supported by the rear end of a tractor 19 and coupled thereto as by means of a hitch 21. Thus, the trailer is supported at one end by the tandem axle and wheel assemblies 12, 13 and at the other end by the tractor 19. In the illustrated case, two cargo containers 22, 23, are secured atop the bed 24 of the trailer in longitudinal end-to-end relation. Such containers are typically provided with doors in their end walls. Thus, the container 22 may be readily unloaded, unobstructed access being available through the end doors thereof. However, the end doors of container 23 are adjacent the tractor 19 which would normally obstruct access thereto. This difficulty is overcome in accordance with the present invention by the provision of means for selectively reversing the trailer to permit hitching of the tractor to the end adjacent container 22 and unobstructed access to the doors of container 23.

Reversal of the trailer 11 is facilitated by means of the tandem axle and wheel assemblies 12, 13 which are separable from each other and selectively movable longitudinally of the trailer. Separate brake systems are associated with the wheels 17, 18 of the respective assemblies whereby the wheels of one assembly may be selectively locked while the wheels of the other assembly are released, and vice versa. Thus, in a manner which will be subsequently more fully described, the inner assembly 13 may be released for longitudinal movement relative to the trailer and the wheels 18 thereof locked. With the wheels 17 of assembly 12 released, the tractor is employed to move the trailer backward, the trailer moving relative to assembly 13 to a position wherein the assembly is at the opposite end of the trailer, i.e., the end adjacent container 23. The assembly 13 is locked to the trailer, and the respective assemblies 12, 13 thus now support the opposite ends of the trailer. The tractor is decoupled from hitch 21 and maneuvered to the opposite end of the trailer for coupling to a hitch 26 provided thereat. By a similar but opposite maneuver the trailer is pulled forward to position the assembly 12 at the opposite end thereof adjacent assembly 13, and the assembly 12 is then locked in position.

Considering now the assemblies 12, 13 in detail and the manner in which they are secured to the trailer, it should be noted that both assemblies are identical, and therefore only one is described in detail, it being understood that the other assembly is similarly provided. The assembly 12 includes a hollow substantially rectangular support frame 27 having bottom, top, and side walls 28, 29, 31. The axle 14 is secured transversely of the frame 27, preferably by means of a pair of conventional air suspension units 32 of a type which facilitate limited raising or lowering of the bed 24 relative to the axle. Slidable mounting of the assembly is facilitated by means of a pair of upright flanges 33 which extend along the top wall 29 of the frame in inwardly spaced relation to the opposite side walls 31. The flanges and portions of the top wall extending outwardly therefrom define angularly related bearing surfaces for slidably engaging a pair of rails 34 which extend longitudinally along the bottom of the bed 24 in inwardly spaced relation to the sides thereof. The rails are preferably of hollow rectangular cross section with the inner and bottom walls thereof being engaged by the bearing surfaces of the support frame 27. In order to minimize friction, strips 36 of low friction material, such as Teflon, are preferably secured to the top wall of the frame in the regions between the flanges and side walls. In addition, an inverted T-shaped rail 37 is secured to the bed 24 to extend longitudinally thereof intermediate the rails 34. The laterally projecting lips 38 of the rail 37 are engaged by upwardly and inwardly projecting brackets 39 provided centrally of the frame 27. It will be thus appreciated that the frame is slidable on the rails 24, 37. In this manner the assemblies 12, 13 are longitudinally translatable with respect to the bed of the trailer.

Each of the assemblies 12, 13 further includes means for selectively locking same at different longitudinal positions along the rails. To this end the frame 27 of each assembly preferably carries locking pins 41 which extend outwardly through the flanges 33 for selective engagement in pluralties of longitudinally spaced apertures 42 provided in the rails 34. Movement of the pins in and out of the associated apertures is preferably accomplished by means of a pair of pneumatic cylinders 43 mounted on the top wall of the frame 27 adjacent the respective pins. Each cylinder includes a piston rod 44 pivotally secured to one end of a medially pivoted lever arm 46, the opposite end of which is pivotally secured to the adjacent pin. When the piston rod 44 is retracted to a position wherein the lever arm engages a stop 47, the pin is withdrawn from the apertures 42 and the frame is thus free for translation along the rails. Extension of the piston rod causes the locking pin to engage an aligned one of the apertures and thereby lock the frame in position. Air for motivating the cylinders carried by each frame is supplied by a pressure tank 48 mounted therein and coupled thereto through a control valve (not shown) which is preferably provided in the cab of the tractor 19 so as to be readily accessible to the driver.

As previously noted the wheels 17, 18 of the assemblies 12, 13 are associated with separate brake systems. Inasmuch as the assemblies are translatable relative to the bed of the trailer, the brake lines 49 of the brake systems associated therewith are preferably coiled so as to be extensible during translation of the assemblies.

Considering now a typical reversing operation of the trailer 11 with reference to FIGURES 5–9, the trailer is initially positioned with the container 22 adjacent an unloading dock 51 and the tractor hitched to the opposite end of the trailer. Subsequent to unloading of the container 22 and when it is desired to unload the container 23, the tractor pulls forward, as indicated by the arrow 52, to move the trailer away from the dock. The assembly 13 is then released for translation relative to the rails 34, 37 by pneumatically effecting withdrawal of the associated locking pins 41 from the apertures 42. The pins of assembly 12 are retained in locking engagement with the apertures. The brakes associated with wheels 17 of assembly 12 are released, while the wheels 18 of assembly 13 are locked by their associated brakes. The tractor is then backed up as indicated by the arrow 53 in FIGURE 6, the trailer being thereby moved rearwardly relative to the assembly 13 which is maintained in position by the braked wheels 18 thereof. The trailer is ultimately moved to a position wherein the assembly 13 is at the opposite end thereof from the assembly 12. The locking pins of assembly 13 are then pneumatically actuated into engagement with aligned ones of the apertures 42. The tractor is now uncoupled from the hitch 21 and turned around, as depicted by the arrow 54 in FIGURE 7. The tractor is driven to the opposite end of the trailer and coupled to the hitch 26. Thereafter, assembly 12 is released for translation relative to the rails 34, 37 by pneumatic withdrawal of the locking pins of such assembly. The brakes associated with the wheels 17 of assembly 12 are set, while those associated with the wheels 18 of assembly 13 are released. The tractor is driven forward, as indicated by the arrow 56 in FIGURE 8, thereby moving the trailer forward relative to the assembly 12 and the assembly 13 locked to the trailer toward the assembly 12. When the trailer is positioned such that the assembly 12 is adjacent the assembly 13, as shown in FIGURE 9, the assembly 12 is locked to the bed by actuation of its locking pins 41. The tractor may then be turned around, as indicated by the arrow 57 and backed up to move the trailer into a position where the container 23 is adjacent the loading dock 51.

What is claimed is:

1. A reversible semitrailer comprising a bed, cargo housing container means mounted on said bed and presenting a loading entrance at each end of said semitrailer, said bed having rails extending longitudinally thereof, a pair of axle and wheel assemblies, means separately mounting each of said assemblies slidably on said rails for individual selective movement of each longitudinally of said bed, a separate brake system including extensible brake lines for the wheels of each of said assemblies permitting individual braking of each assembly, means for selectively locking each of said assemblies individually to said bed adjacent each end thereof, and hitch means at each end of said bed for coupling said trailer to a pulling vehicle so that said semitrailer may be drawn from either end and may be loaded and unloaded from the end opposite from which it is drawn while supported by one of said wheel assemblies at each end.

2. A reversible semitrailer according to claim 1, further defined by said bed having a pair of longitudinal rails of rectangular cross section in inwardly spaced relation to the opposite sides thereof and a longitudinal rail of inverted T-shaped cross section intermediate said pair of rails having laterally projecting lips, said frame having longitudinally extending flanges in inwardly spaced relation to the opposite sides thereof projecting upwardly from the top thereof, said flanges and the portions of said top of said frame extending outwardly therefrom defining pairs of angularly related bearing surfaces engaging the inner side and bottom walls of said rails of rectangular cross section, said frame having upwardly and inwardly projecting brackets engaging said lips.

3. A reversible semitrailer according to claim 2, further defined by strips of low friction material secured to the top of said frame in said portions thereof extending outwardly from said flanges.

4. A reversible semitrailer according to claim 2, further defined by said locking means comprising a pair of lock pins extending outwardly through said flanges for engagement in pluralities of longitudinally spaced apertures in said rails of rectangular cross section, and pneumatic means coupled to said pins for selectively moving same into and out of engagement with said apertures.

5. A reversible semitrailer according to claim 4, further defined by said pneumatic means comprising a pneumatic cylinder mounted on said frame adjacent each of said pins, said cylinder having a retractible piston rod extending therefrom, and a medially pivoted lever arm having its opposite ends respectively pivotally secured to said rod and said pin.

References Cited

UNITED STATES PATENTS

| | | | |
|---|---|---|---|
| 2,835,504 | 5/1958 | Acker | 280—81 |
| 2,839,311 | 6/1958 | Locker | 280—81 |
| 2,962,295 | 11/1960 | Tenenbaum | 280—81 |
| 2,986,408 | 5/1961 | Black | 280—423 |
| 3,004,772 | 10/1961 | Bohlen et al. | 280—415 |
| 3,191,966 | 6/1965 | Felburn | 280—81 X |
| 3,259,400 | 7/1966 | Tantlinger et al. | 280—423 |
| 3,314,689 | 4/1967 | Hogan | 280—81 |

LEO FRIAGLIA, *Primary Examiner.*